United States Patent [19]

Katoh

[11] 4,163,076
[45] Jul. 31, 1979

[54] SYNTHETIC RESIN WINDOW MOLDING

[75] Inventor: Hisanori Katoh, Tokyo, Japan

[73] Assignee: Inoue Gomu Kogyo Kabushiki Kaisha, Aichi, Japan

[21] Appl. No.: 839,752

[22] Filed: Oct. 5, 1977

[51] Int. Cl.² .............................................. B32B 15/08
[52] U.S. Cl. ................... 428/339; 428/122; 428/332; 428/335; 428/358; 428/457; 428/458; 428/462; 428/463
[58] Field of Search ............. 428/358, 122, 124, 125, 428/126, 337, 339, 332, 334, 335, 458, 462, 463, 457

[56] References Cited

U.S. PATENT DOCUMENTS

| | | | |
|---|---|---|---|
| 3,155,204 | 11/1964 | Campbell | 52/208 |
| 3,226,287 | 12/1965 | Shanok et al. | 428/164 |
| 3,440,129 | 4/1969 | Anselm | 428/376 |
| 3,448,550 | 6/1969 | Herr et al. | 52/98 |
| 3,487,420 | 12/1969 | Herr et al. | 52/98 |
| 3,547,516 | 12/1970 | Shanok et al. | 350/97 |
| 3,706,628 | 12/1972 | Azzola | 428/358 X |
| 3,745,056 | 7/1973 | Jackson | 428/157 |
| 3,759,004 | 9/1973 | Kent | 52/400 |
| 3,774,363 | 11/1973 | Kent | 52/400 |
| 3,811,989 | 5/1974 | Hearn | 428/122 |
| 3,914,482 | 10/1975 | Sawa et al | 428/458 X |
| 3,922,460 | 11/1975 | Jackson | 428/164 X |
| 3,934,385 | 1/1976 | Paulus et al. | 428/358 |
| 3,993,819 | 11/1976 | Fewkes | 428/457 |
| 4,042,741 | 8/1977 | Bright | 428/358 X |

Primary Examiner—Lorraine T. Kendell
Attorney, Agent, or Firm—Armstrong, Nikaido, Marmelstein & Kubovcik

[57] ABSTRACT

Synthetic resin window molding or trim strip for a direct glazing system characterized in that a protective layer of a soft plastic material is formed at the part where a window molding or trim strip completely made of stainless foil and synthetic resin contacts the car body or the car window glass.

6 Claims, 6 Drawing Figures

SYNTHETIC RESIN WINDOW MOLDING

BACKGROUND OF THE INVENTION

The conventional window molding for direct glazing system which is compositely made of metal and synthetic resin contacts the car body or the car window glass, but it is not rigidly fitted thereto. Therefore, while the vehicle is running, vibration noises can be generated from such window moldings or the glazed parts can be damaged. Such a window molding, which can be basically ABS resin or a polycarbonate resin, does not have the metal portion itself in direct contact with the car body or the glass, but because the resin is hard, the body or the glass can be damaged.

SUMMARY OF THE INVENTION

The present invention relates to an improvement for synthetic resin window moldings or trim strips for a direct glazing system by which the car body window is directly glazed using a bonding agent.

The main object of the present invention is to provide a protective layer of soft plastic material, in a composite window molding or trim strip of stainless foil and synthetic resin, where the molding contacts the car body and/or where it contacts the window glass such that the window glass and the stainless foil of the molding will not be damaged.

DETAILED DESCRIPTION OF THE INVENTION

The present invention is intended to eliminate the drawbacks of conventional moldings and provides a synthetic resin window molding or trim strip which is free from noise generation and less prone to damage from car body vibrations.

Figure 1:
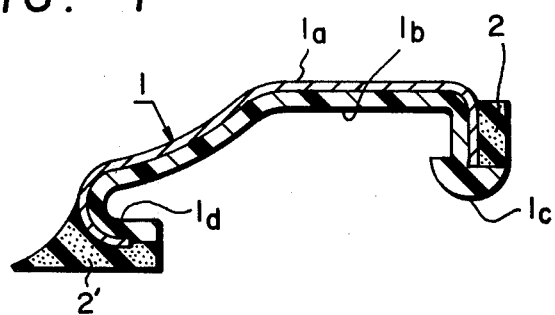
FIGS. 1 and 2 are sectional views of a molding according to the present invention.
Figure 2:
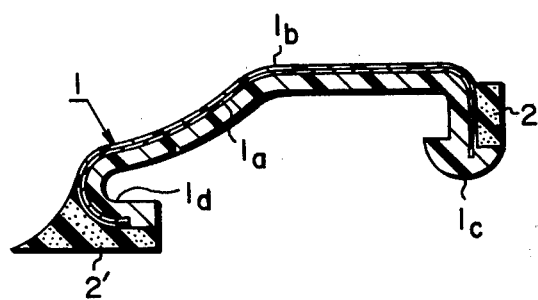

Referring to FIG. 1, a synthetic resin molding or trim strip 1 (hereinafter referred to as molding) according to the present invention is in the form of a band with an approximate C-shaped section which is composed of a metal such as a stainless foil 1a bonded to the surface of a synthetic resin 1b or, as illustrated in FIG. 2, a stainless foil 1a embedded in a synthetic resin 1b. Where molding 1 contacts the car body of the window glass, a protective layer of soft plastic material 2 and 2' is integrally provided to prevent contact between the foil and the car body or window glass. The ends of molding 1 have an anchor 1c and a bend 1d. In the Figures shown, the protective layer 2 is provided outside of anchor 1c and is positioned between the molding and car body and protective layer 2' is below bend 1d and positioned between the molding and widow glass.

The base of the molding may be prepared from a synthetic resin 1b which may be made from rigid plastic materials such as ABS resins, acrylic resins, polycarbonate resins and the like. The stainless foil to be bonded on the surface of the resin or embedded therein is formed to a thickness in the range of from about 30 to about 50μ. The stainless foil bonded on the resin surface may be coated with a clear synthetic resin material such as polyvinyl chloride, cellulose acetate, butyrate resins and the like. As the protective layer 2 and 2' to cover the molding 1, where it contacts the car body and/or window glass, soft plastic materials may be used such as soft polyvinyl chloride resin, vinyl acetate resin, an ethylene-vinyl acetate copolymer and the like. The protective layer is formed to a thickness in the range of from about 0.5 to about 2mm.

The molding 1 of the structure described above may be integrally formed by, for example, plastic extrusion molding as known in the art.

Figure 3:
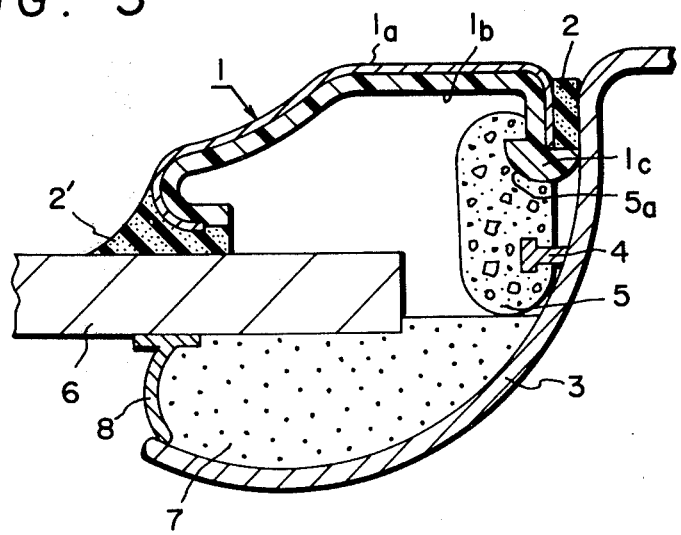
FIG. 3 is a sectional view illustrating a glazed window using a molding according to the present invention.

Referring to FIG. 3, which shows a sectional view of the molding as it is assembled in a car body, the molding is attached to the car body and thereby the window glass is stabilized.

A stud 4 having a T-shape is welded to the car body 3 and a resin or rubber clip 5 is provided for attaching the molding 1. Anchor 1c is placed into a mold-fitting area 5a of clip 5 and molding 1 is assembled into the car body 3. As a result, protective layer 2 of molding 1 rests against the car body 3.

After the window glass 6 is placed into a space between molding 1 (protective layer 2') and the car body 3, a bonding agent 7, such as prepared from a polyurethane resin base or Thiokol (trade name; polysulfide synthetic resin rubber of Thiokol Chemical Corp.), is applied between window glass 6 and car body 3. A bonding stopper 8 supports the window glass 6.

Thus, the molding according to the present invention is characterized in that the part which contacts the car body and/or the window glass is provided with a protective layer of soft plastic material, thereby, preventing the generation of noise due to any vibrations while the vehicle is being operated and, also, preventing damage to the window glass and the car body with the result that long years of trouble-free service is made possible.

What is claimed is:

1. A window molding comprising:
   (a) a layer of synthetic resin having first and second end portions at the opposite ends thereof, said resin layer with said first and second end portions forming an approximate C-shape, wherein the first end portion is an anchor and the second end portion is bent at an angle with respect to the remainder of said resin layer;
   (b) a stainless foil adhered to one surface of said resin layer wherein said first and second end portions of said one surface extend beyond the ends of said stainless foil; and
   (c) first and second protective layers of soft plastic material, said first protective layer being adhered to one end portion of said stainless foil and said first end portion of said resin layer and said second protective layer being adhered to the other end portion of said stainless foil and said second end portion of resin layer.

2. The molding of claim 1, wherein the synthetic resin is ABS resin or polycarbonate resin.

3. The molding of claim 1, wherein the stainless foil has a thickness in the range of from about 30 to about 50μ.

4. The molding of claim 1, wherein the stainless foil is coated with a thin film of polyvinyl chloride resin, cellulose acetate resin or butyrate resin.

5. The molding of claim 1, wherein the protective layer of soft plastic material is soft polyvinyl chloride resin, vinyl acetate resin, or an ethylene-vinyl acetate copolymer.

6. The molding of claim 1, wherein the protective layer has a thickness in the range from about 0.5 to about 2 mm.

* * * * *

UNITED STATES PATENT AND TRADEMARK OFFICE
CERTIFICATE OF CORRECTION

PATENT NO. : 4,163,076
DATED : July 31, 1979
INVENTOR(S) : HISANORI KATOH

It is certified that error appears in the above-identified patent and that said Letters Patent are hereby corrected as shown below:

On the cover page, after Item [22], insert

--- [30]   Foreign Application Priority Data

April 5, 1977    Japan................52-42175 ---.

Signed and Sealed this

Twenty-fourth Day of June 1980

[SEAL]

Attest:

SIDNEY A. DIAMOND

Attesting Officer    Commissioner of Patents and Trademarks